(12) United States Patent
Umeno et al.

(10) Patent No.: US 8,329,136 B2
(45) Date of Patent: Dec. 11, 2012

(54) GRAPHITE PARTICLE, CARBON-GRAPHITE COMPOSITE PARTICLE AND THEIR PRODUCTION PROCESSES

(75) Inventors: Tatsuo Umeno, Kitakyushu (JP); Takashi Iwao, Kitakyushu (JP)

(73) Assignee: Nippon Coke & Engineering Company, Limited, Tokyo (JP)

( * ) Notice: Subject to any disclaimer, the term of this patent is extended or adjusted under 35 U.S.C. 154(b) by 1217 days.

(21) Appl. No.: 12/086,432

(22) PCT Filed: Dec. 13, 2006

(86) PCT No.: PCT/JP2006/324877
§ 371 (c)(1), (2), (4) Date: Jun. 12, 2008

(87) PCT Pub. No.: WO2007/069664
PCT Pub. Date: Jun. 21, 2007

(65) Prior Publication Data
US 2009/0258298 A1 Oct. 15, 2009

(30) Foreign Application Priority Data

Dec. 14, 2005 (JP) .................................. 2005-360883

(51) Int. Cl.
*C01B 31/04* (2006.01)
*H01M 4/133* (2010.01)

(52) U.S. Cl. ..................... 423/448; 429/231.4; 29/623.1

(58) Field of Classification Search .................. None
See application file for complete search history.

(56) References Cited

U.S. PATENT DOCUMENTS 6,139,990 A 10/2000 Kubota et al.
6,841,248 B2 * 1/2005 Klug ............................. 428/408
2001/0033822 A1 10/2001 Ishii et al.
2002/0197534 A1 * 12/2002 Fukuda et al. ............. 429/231.4

FOREIGN PATENT DOCUMENTS

| JP | 11-263612 A | 9/1999 |
|---|---|---|
| JP | 2001-213615 A | 8/2001 |
| JP | 2003-238135 A | 8/2003 |
| JP | 2004-63457 A | 2/2004 |
| JP | 2004-111108 A | 4/2004 |
| JP | 2004-111110 A | 4/2004 |
| JP | 2004-196609 A | 7/2004 |
| JP | 2004-299944 A | 10/2004 |
| JP | 2005-123206 A | 5/2005 |
| WO | WO-02/059040 A1 | 8/2002 |

* cited by examiner

*Primary Examiner* — Barbara Gilliam
*Assistant Examiner* — Kwang Han
(74) *Attorney, Agent, or Firm* — Birch, Stewart, Kolasch & Birch. LLP

(57) ABSTRACT

The present invention relates to a graphite particle and a carbon-graphite composite particle both suitable for use in electrode for lithium ion secondary battery, as well as to processes for producing these particles. The graphite particle of the present invention has an average particle diameter of 5 to 50 μm, wherein one or more recesses having a depth of 0.1 to 10 μm are formed in the surface. The graphite particle is produced by a mixing step for mixing raw material graphite particles and recess-forming particles, a press molding step for press-molding the mixture composed of the raw material graphite particles and the recess-forming particles to obtain a molded article, a pulverization step for pulverizing the molded article, and a separation step for separating and removing the recess-forming particles from the pulverized molded article. The carbon-graphite composite particle of the present invention is produced by performing a thermal CVD step which comprises covering the surface of the above-mentioned graphite particle with a carbon layer.

10 Claims, 7 Drawing Sheets

(a)

(b)

(c)

(a)

(b)

(c)

GRAPHITE PARTICLE, CARBON-GRAPHITE COMPOSITE PARTICLE AND THEIR PRODUCTION PROCESSES

TECHNICAL FIELD

The present invention relates to a graphite particle and a carbon-graphite composite particle both used suitably, for example, as a negative electrode material for lithium secondary battery, of high capacity, high coulomb efficiency, high load characteristic and excellent cycle life characteristic, as well as to processes for producing these particles.

BACKGROUND ART

As electric appliances such as cellular phone and the like have become smaller and lighter and have come to possess diversified functions, lithium ion secondary battery used therein is required to have a higher capacity.

The current high capacity of lithium ion secondary battery has been achieved partly by the improvement in structure and material of lithium ion secondary battery and the use of positive electrode material of high capacity. However, the biggest contribution to the high capacity of lithium ion secondary battery can be said to be the increase in bulk density (electrode density), realized for the negative electrode produced using graphite particles.

However, when the electrode density of negative electrode is increased to 1.7 g/ml or more, problems observed seldom at low electrode densities appear markedly. They are specifically reduction in diffusion of electrolytic solution into electrode, reduction in high rate charge-discharge characteristic, deterioration in cycle life characteristic, etc. Therefore, it is difficult to allow lithium ion secondary battery to have an even higher capacity by allowing a negative electrode produced using graphite to have a higher density.

Hence, the present inventor made an investigation on the negative electrode produced using the carbon-graphite composite particles obtained by applying a chemical vapor deposition (CVD) treatment on the surfaces of graphite particles (see, for example, Patent Literature 1). The negative electrode produced using such carbon-graphite composite particles shows good diffusion of electrolytic solution into electrode and high rate charge-discharge characteristic of lithium ion even when the negative electrode has been molded so as to have an electrode density of 1.7 g/ml or more. On the other hand, the negative electrode has problems such as swelling and peeling of electrode, deterioration in cycle life characteristic and the like. Therefore, with the carbon-graphite composite particles, when they are used as a negative electrode material, it is necessary to mix them with a material of good cycle life characteristic or add thereto a conductive material.

Mixing or addition of such an auxiliary material or conductive aid incurs the impairment by auxiliary material, of the good diffusion of electrolytic solution into electrode and high rate charge-discharge characteristic which are characteristic of carbon-graphite composite particles.

Patent Literature 1: JP-A-2001-213615 (Claims)

DISCLOSURE OF THE INVENTION

Task to be Achieved by the Invention

The present inventors thought that the carbon-graphite composite particles subjected to a CVD treatment, if their cycle life characteristic could be improved, could show good electrode properties even when molded so as to have an electrode density of 1.7 g/ml or more, and could contribute to a higher capacity of lithium ion secondary battery. Making a further investigation based on the above idea, the present inventors thought of formation of recesses in the surface of graphite particle or carbon-graphite composite particle. It was found that these particles, when intended recesses were formed in the surfaces, could contribute to a higher capacity of lithium ion secondary battery. The finding led to the completion of the present invention.

The present invention has been made in view of the above situation. The present invention aims at providing a graphite particle and a carbon-graphite composite particle, which have solved the above-mentioned problems and can provide a negative electrode material for lithium secondary battery, of high rate charge-discharge capacity, high coulomb efficiency and excellent charge-discharge cycle life characteristic, and processes for producing these particles.

Means for Achieving the Task

The present invention which has achieved the above aim, is as described below.

[1] A graphite particle having an average particle diameter of 5 to 50 μm, wherein one or more recesses having a depth of 0.1 to 10 μm are formed in the surface.

[2] A graphite particle according to [1], which has inside a laminated structure of graphite layers bent along the shape of each recess and converging toward the periphery of each recess.

[3] A graphite particle according to [1], which has an approximately spherical shape having an aspect ratio of 1 to 3 and has inside a laminated structure of graphite layers wherein each AB plane of graphite crystal is bent concentrically along the particle surface.

[4] A graphite particle according to [1], which has a polyhedral shape having an aspect ratio of 1 to 3 and has inside a laminated structure of graphite layers wherein each AB plane of graphite crystal is bent irregularly.

[5] A graphite particle according to [1], which has a scaly shape having a length of 5 to 50 μm in the planar direction of particle and a thickness of 5 to 20 μm and has inside a laminated structure of graphite layers wherein each AB plane of graphite crystal is planar.

[6] A graphite particle according to [1], wherein the areal ratio of the voids in particle section is 5% or less of the total area of particle section.

[7] A graphite particle according to [1], wherein the peak intensity ratio (002/110) of 002 plane (26.4°) and 110 plane (77.4°) by X-ray diffractometry is 400 or less and the peak intensity ratio ($I_{1360}/I_{1580}$) of 1580 cm$^{-1}$ peak intensity $I_{1580}$ and 1360 cm$^{-1}$ peak intensity $I_{1360}$ by Raman spectroscopy is 0.3 or less.

[8] A graphite particle according to [1], which has a specific surface area of 40 m$^2$/g or less and a tap density measured for whole particles, of 0.5 to 1.5 g/ml.

[9] A carbon-graphite composite particle comprising a graphite particle set forth in [1] and a carbon layer covering the surface of the graphite particle.

[10] A carbon-graphite composite particle comprising a graphite particle set forth in [1] and a carbon layer covering the surface of the graphite particle, which has an average particle diameter of 5 to 50 μm and wherein one or more recesses having a depth of 0.1 to 10 μm are formed in the surface.

[11] A carbon-graphite composite particle according to [9], or [10], wherein the coverage amount of carbon is 0.1 to 20% by mass.

[12] A carbon-graphite composite particle according to [9] or [10], wherein the peak intensity ratio (002/110) of 002 plane (26.4°) and 110 plane (77.4°) by X-ray diffractometry is 400 or less and the peak intensity ratio ($I_{1360}/I_{1580}$) of 1580 cm$^{-1}$ peak intensity $I_{1580}$ and 1360 cm$^{-1}$ peak intensity $I_{1360}$ by Raman spectroscopy is 1.0 or less.

[13] A carbon-graphite composite particle according to [9] or [10], which has a specific surface area of 10 m$^2$/g or less and a tap density measured for whole particles, of 0.5 to 1.5 g/ml.

[14] A process for producing a graphite particle set forth in [1], which comprises a mixing step for mixing raw material graphite particles and recess-forming particles, a press molding step for press-molding the mixture composed of the raw material graphite particles and the recess-forming particles to obtain a molded article, a pulverization step for pulverizing the molded article, and a separation step for separating and removing the recess-forming particles from the pulverized molded article to obtain a graphite particle.

[15] A process for producing a graphite particle according to [14], wherein each raw material graphite particle has an approximately spherical shape having an aspect ratio of 1 to 3 and has inside a laminated structure of graphite layers wherein each AB plane of graphite crystal is bent concentrically along the particle surface.

[16] A process for producing a graphite particle according to [14], wherein each raw material graphite particle has a scaly shape.

[17] A process for producing a graphite particle according to [14], wherein the raw material graphite particles are artificial graphite or a natural graphite and have a spherical, scaly, pseudo-spherical, elliptical, fibrous, spindle-like, or onion-like shape.

[18] A process for producing a graphite particle according to [14], wherein the material of the recess-forming particles is selected from metals, oxides, synthetic polymers, carbon compounds, sublimable or volatile chemical substances, and vegetable polymers and has an average particle diameter of 1 to 20 μm.

[19] A process for producing a graphite particle according to [14], wherein the material of the recess-forming particles is selected from iron, copper, tin, aluminum and nickel; silica, alumina, zinc oxide and iron oxide; polyethylene, polyethylene terephthalate, polypropylene, polystyrene, polymethyl methacrylate, tetrafluoroethylene and phenolic resin; coal, coal tar, coal pitch, petroleum pitch, coke, charcoal, carbon black, carbon formed by heat treatment, and precursor or derivative thereof; naphthalene, olefin, natural wax, synthetic wax, malic acid, maleic acid and ammonium sulfate; wheat flour, starch, corn starch, carboxy cellulose, carboxymethyl cellulose, and precursor or derivative thereof.

[20] A process for producing a graphite particle according to [14], wherein the mixing ratio of the recess-forming particles to the raw material graphite particles is 1 to 60% by mass.

[21] A process for producing a graphite particle according to [14], wherein the raw material graphite particles have an average particle diameter of 5 to 50 μm, a tap density of 0.5 to 1.3 g/ml, a specific surface area of 1 to 40 m$^2$/g, and an ash content of 0.2% by mass or less.

[22] A process for producing a carbon-graphite composite particle set forth in [9] or [10], which comprises covering the surfaces of graphite particles having an average particle diameter of 5 to 50 μm and having, in the surfaces, one or more recesses having a depth of 0.1 to 10 μm, with a carbon layer by a thermal CVD step.

[23] A process for producing a carbon-graphite composite particle according to [22], wherein the thermal CVD step is performed in a fluidized bed type reaction furnace, in an inert atmosphere, at 800 to 1,200° C., by a thermal CVD method using an organic solvent as a carbon source and wherein the coverage amount of carbon to graphite particle is 0.1 to 20% by mass.

[24] A negative electrode for lithium ion secondary battery, produced by using a graphite particle set forth in [1] or a carbon-graphite composite particle set forth in [9] or [10].

[25] A lithium ion secondary battery containing a negative electrode produced by using a graphite particle set forth in [1] or a carbon-graphite composite particle set forth in [9] or [10].

Effects of the Invention

The graphite particle and the carbon-graphite composite particle both of the present invention have an intended concave-convex shape at their surfaces. With a negative electrode for lithium ion secondary battery, produced using the graphite particle or the carbon-graphite composite particle, neither diffusion of electrolytic solution into electrode nor high rate charge-discharge characteristic is impaired even when the electrode density has been increased to 1.7 g/ml or more. Further, the negative electrode has excellent cycle life characteristic and can contribute to a higher capacity of lithium ion secondary battery.

The graphite particle and the carbon-graphite composite particle both of the present invention have a concave-convex shape at their surfaces; therefore, when a negative electrode is produced therefrom, particle-to-particle contact is seen at a plurality of points, resulting in low electric resistance. Meanwhile, with a conventional graphite particle having no recess, particle-to-particle contact is point contact, resulting in high electric resistance. Therefore, when a battery is produced using the present particle, the charge-discharge energy density is large.

EXPLANATION OF NUMERALS

In the above figures, 12, 22, 32, 46 and 56 are each a recess; 14, 26, 36, 49 and 59 are each a bulge; 16, 26, 36, 44 and 54 are each a graphite layer; 17a, 17b, 37a and 37b are each a laminated structure; 42 and 52 are each a recess-forming particle; 48, 57, 58, 100, 200 and 300 are each a graphite particle; A is a straight line indicating peak height; B is a straight line indicating bottom height; C and D are each a straight line indicating peak position; and E is a straight line indication position of measurement.

BEST MODE FOR CARRYING OUT THE INVENTION

Figure 1:
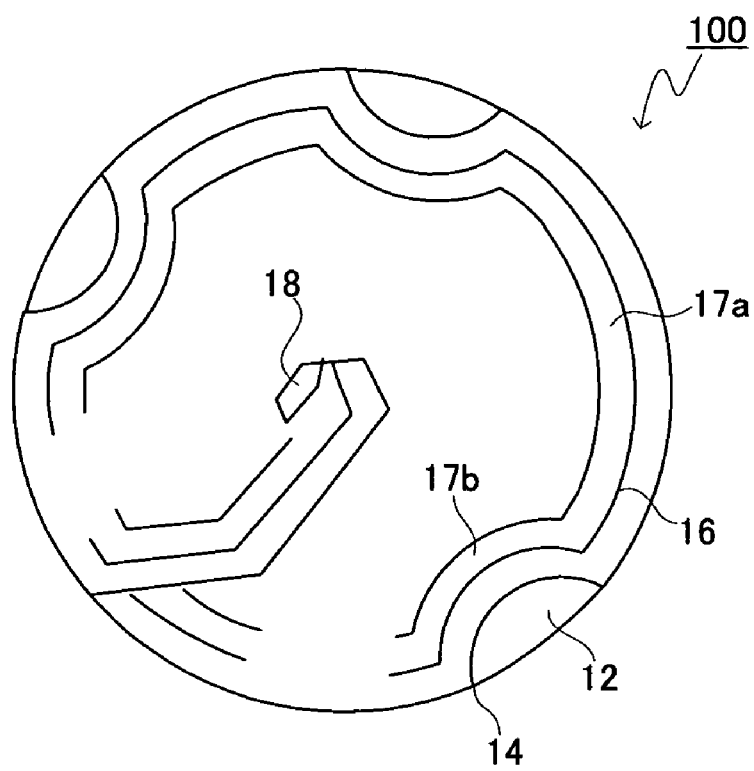
FIG. 1 is a schematic sectional view showing an example of the graphite particle of the present invention.

Spherical Graphite Particle Having a Laminated Structure of Bent Graphite Layers FIG. 1 is a schematic sectional view showing an example of the graphite particle of the present invention.

The appearance of the graphite particle 100 of the present invention is nearly spherical and the aspect ratio thereof is 1 to 3, preferably 1 to 2.

The graphite particle 100 has an average particle diameter of preferably 5 to 50 μm, more preferably 15 to 30 μm considering its use as a negative electrode material. When the average particle diameter is larger than 50 μm, it is difficult to apply the negative electrode material uniformly on a collector. When the average particle diameter is smaller than 5 μm, a large amount of a solvent is needed when a slurry is prepared from the negative electrode material and a binder, which tends to provide a fragile electrode.

In the surface of the graphite particle 100 are formed semispherical recesses 12, as shown in FIG. 1.

The recesses 12 formed in the surface of the graphite particle 100 has a depth of 0.1 to 10 μm, preferably 0.5 to 8 μm. When the depth of each recess is larger than 10 μm, the concave-convex shape of particle is unclear and, when the depth is smaller than 0.1 μm, the negative electrode material formed therewith has a high electric resistance.

The diameter of each recess 12 is preferably 1 to 20 μm, more preferably 3 to 15 μm, particularly preferably 3 to 10 μm. Further, the diameter of each recess 12 is preferably about ⅛ to ⅓, more preferably ⅕ to ⅓ of the particle diameter of graphite particle. The number of the recesses formed in the surface of the graphite particle 100 is at least one, preferably five or more, more preferably 10 or more per one particle.

Graphite layers 16 are present inside the graphite particle 100. Observation of the graphite layers 16 in the section of graphite particle 100 with an electron microscope indicates that stripe-like lines showing a laminated structure formed by lamination of the AB plane of graphite crystal are mostly curved, making the laminated structure complicated. In any randomly selected section of graphite particle 100 can be seen a laminated structure 17a of graphite layers wherein each AB plane of graphite crystal is bent and laminated concentrically along the surface of graphite particle. One laminated structure 17a is formed in one graphite particle.

The graphite particle 100 has, on the surface, substantially no such front end (edge) of AB plane as seen in a graphite particle 300 described later. The shape of the graphite particle 100 is a nearly complete sphere except that recesses 12 are formed in the particle surface, and the particle surface is formed by a substantially continuous graphite layer. The surface of the graphite particle is formed by the AB plane of graphite crystal.

In the vicinity of the surface of each recess 12 is present a laminated structure 17b of graphite layers 16 which are bent along the surface shape of the recess. A bulge 14 is formed at the periphery of each recess 12 formed in the surface of particle, and the bulge 14 has such a structure that the graphite layer 16 is converged toward the front end of bulge.

A plurality of voids 18 are present inside the graphite particle 100. The voids are formed when, in the later-described production process of graphite particle, scaly natural graphite or the like (which becomes a raw material of graphite particle 100) is subjected to a treatment for conversion into spherical shape.

Figure 2:
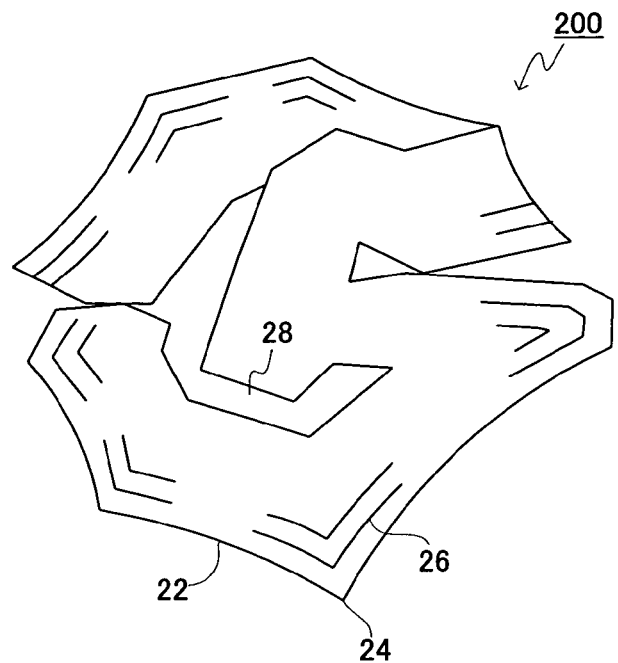
FIG. 2 is a schematic sectional view showing other example of the graphite particle of the present invention.

Spherical Graphite Particle Having a Laminated Structure of Irregularly Bent Graphite Layers FIG. 2 is a schematic sectional view showing other example of the graphite particle of the present invention.

The graphite particle 200 of the present invention has an average particle diameter of 5 to 50 μm. In its surface are formed recesses 22 having a spherical surface, as shown in FIG. 2.

The depth, diameter and number of the recesses 22 formed in the surface of the graphite particle 200 are the same as in the above-mentioned graphite particle 100.

The shape of the graphite particle 200 includes, besides a nearly spherical shape, various three-dimensional shapes, for example, polyhedral shapes (e.g. cubic, rectangular parallelepipedic, triangular pyramid-like and polygonal prism-like). The graphite particle 200 differs from the graphite particle 100 in that its shape is irregular.

Graphite layers 26 are present inside the graphite particle 200 as well. The graphite layers 26 have a laminated structure formed by irregular bending of each AB plane of graphite crystal. The number of such laminated structures is one or more, ordinarily several to 100. Unlike the graphite particle 100, the graphite particle 200 has, inside, no laminated structure graphite layers which are bent concentrically.

The graphite layers 26 are converged toward the front end of each bulge 24 formed at the periphery of each recess 22.

Inside the graphite particle 200 are present voids 28 between the laminated structures each of bent graphite layers 26. The voids 28 are formed during the press molding of raw material graphite conducted in the later-described production process of graphite particle.

The graphite particle 200, when used as a negative electrode material, has an aspect ratio of preferably 1 to 3, more preferably 1 to 2.

Scaly Graphite Particle

Figure 3:
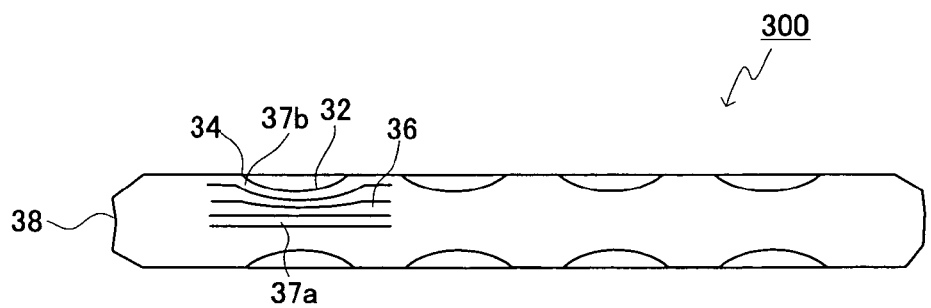
FIG. 3 is a schematic sectional view showing other example of the graphite particle of the present invention.

FIG. 3 is a schematic sectional view showing other example of the graphite particle of the present invention.

The graphite particle 300 of the present invention is a scaly particle. In the surface are formed semi-spherical recesses 32, as shown in FIG. 3. The graphite particle 300 has a length of 5 to 50 μm in any planar direction thereof. The graphite particle 300 has a thickness of 5 to 20 μm.

The depth, diameter and number of the recesses 32 formed in the surface of the graphite particle 300 are the same as in the above-mentioned graphite particle 100.

Inside the graphite particle 300 are present a laminated structure 37a of graphite layers 36 formed by lamination of the AB plane of graphite crystal. In the graphite particle 300, the front ends (edges) of AB plane are exposed to the surface. The front ends of AB plane are present at the peripheries of the scaly graphite particle 300 along the thickness direction of the particle. The graphite particle 300 is constituted by lamination of nearly planar graphite layers. The graphite particle 300 has no void inside.

Recesses 32 are formed in the surface of the graphite layers 36, and the AB plane of graphite crystal is bent along the curved surface of each recess 32, in the vicinity of the recess. As a result, the bulge 34 formed at the periphery of each recess 32 has a laminated structure 37b in which the graphite layers are converged toward the front end of the recess.

Process for Production of Graphite Particle from Spherically Formed Graphite Particle The process for producing the graphite particle 100 of the present invention is described below referring to FIG. 4.

Figure 4:
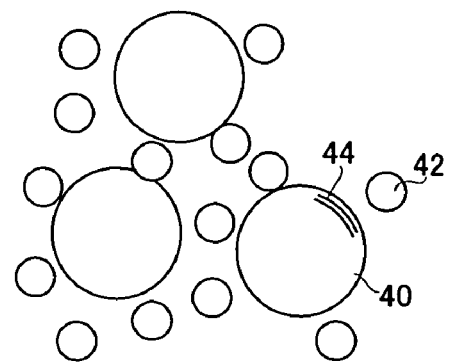
FIG. 4 is a drawing explaining the process for producing the graphite particle of FIG. 1, wherein (a) shows a state in which raw material graphite particles and recess-forming particles have been mixed, (b) shows a state in which the mixture of the raw material graphite particles and the recess-forming particles has been pressed, and (c) shows a state in which the recess-forming particles have been removed from the mixture.
Figure 4:
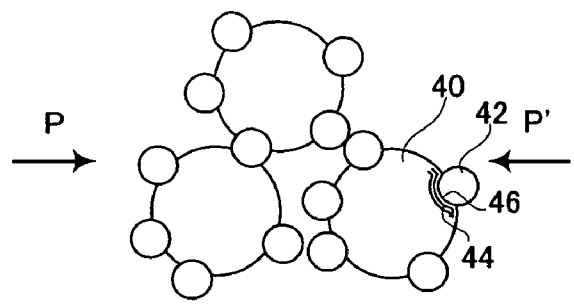
Figure 4:
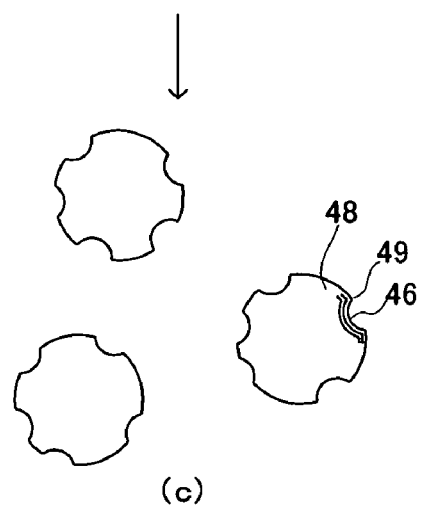

FIG. 4(*a*) shows a state in which raw material graphite particles 40 formed in a nearly spherical shape and recess-forming particles 42 have been mixed.

Each raw material graphite particle 40 has inside a laminated structure of graphite layers 44 which are bent concentrically along the surface of the spherical particle. The diameter of each particle is preferably 5 to 50 μm.

It is possible to use, as the raw material graphite particle 40, a graphite particle treated so as to have a spherical shape by the method described in JP-A-2003-238135. The graphite particle having a spherical shape by the method described in the above literature has inside a laminated structure of graphite layers which are bent concentrically along the surface of the particle.

FIG. 4(*b*) shows a state in which a mixture of the raw material graphite particles 40 and recess-forming particles 42 has been press-molded. The recess-forming particles 42 are forced into the graphite particles 40 by pressure application to the mixture from an arbitrary direction P-P'. This takes place because the raw material graphite particles are softer and deformed more easily than the recess-forming particles. Owing to the pressure application to the mixture, semi-spherical recesses 46 are formed in the surfaces of the graphite particles 40. Simultaneously therewith, the graphite layers 44 in the vicinity of the surface of graphite particle 40 are bent along the shape of the surface of recess-forming particle 42. The curvature of each recess 46 is about the same as the curvature of the surface of recess-forming particle 42. The depth of recess 46 differs depending upon the material of recess-forming particle, the pressure of press molding, etc. but is about 20 to 50% of the diameter of recess-forming particle 42.

After the press molding of the mixture of the raw material graphite particles and the recess-forming particles, the press-molded article obtained is pulverized and the recess-forming particles are separated and removed. FIG. 4(*c*) shows a state in which the recess-forming particles have been separated and removed from the mixture after the pulverization.

Recesses 46 are formed in the surface of each graphite particle 48 obtained. At the periphery of each recess 46 (when two recesses are close, between the recesses) is formed a bulge 49 which projects toward outside. The bulge 49 has a laminated structure wherein graphite layers are converged toward the front end of the bulge. At the front end of the bulge 49, the graphite layers may partially be cut and incontinuous, or may be continuous without being cut.

Incidentally, in FIG. 4, a case is shown in which semi-spherical recesses are formed in graphite particles 48 using spherical, recess-forming particles 42. However, the shape of recess-forming particle 42 is not restricted to a spherical shape as long as recesses having the above-mentioned depth and diameter can be formed in each graphite particle 48.

Process for Production of Graphite Particle from Scaly Graphite Particle

The process for producing the graphite particles 200 and 300 of the present invention is described below referring to FIG. 5.

Figure 5:
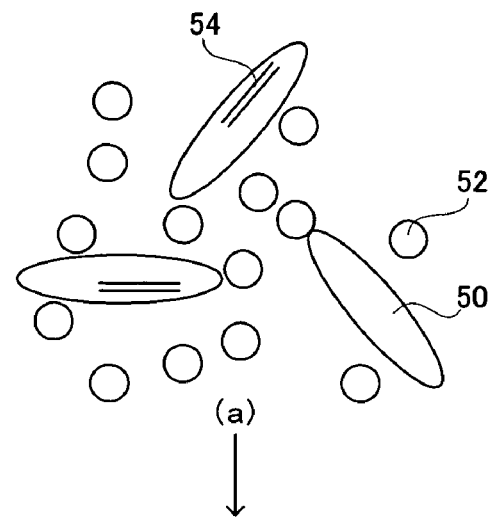
FIG. 5 is a drawing explaining the process for producing the graphite particles of FIG. 2 and FIG. 3, wherein (a) shows a state in which raw material graphite particles and recess-forming particles have been mixed, (b) shows a state in which the mixture of the raw material graphite particles and the recess-forming particles has been pressed, and (c) shows a state in which the recess-forming particles have been removed from the mixture.
Figure 5:
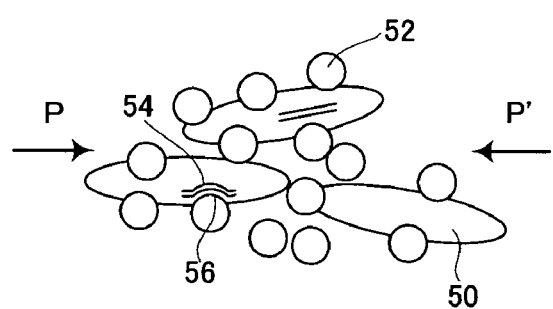
Figure 5:
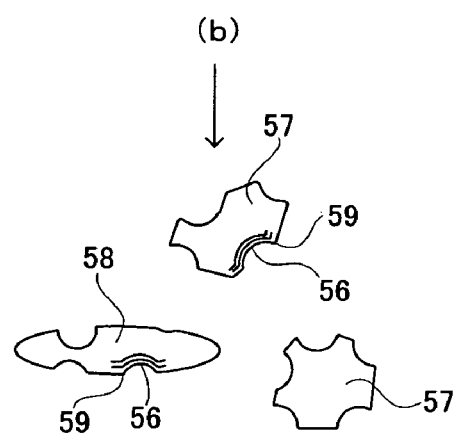

FIG. 5(*a*) shows a state in which scaly raw material graphite particles 50 and spherical, recess-forming particles 52 have been mixed. The raw material graphite particles 50 have a length of 5 to 50 μm in any direction along its plane and a thickness of 5 to 20 μm, and have inside a laminated structure of graphite layers 54 which are laminated in a planar state.

FIG. 5(*b*) shows a state in which a mixture of the raw material graphite particles 50 and the recess-forming particles 52 has been press-molded. When the mixture undergoes a pressure from a random direction P-P', the raw material graphite particles 50 are pushed into between the recess-forming particles 52 and bent. Simultaneously therewith, semi-spherical recesses 56 are formed in the surface of each graphite particle 50. The graphite layers 54 in the vicinity of the surface of graphite particle are bent along the shape of the surface of recess-forming particle 52. The curvature of each recess 56 is about the same as the curvature of the surface of recess-forming particle 52. The depth of recess differs depending upon the material of recess-forming particle 52, the pressure of press molding, etc. but is about 20 to 50% of the diameter of recess-forming particle.

The graphite particles 50 and the recess-forming particles 52 are pressed and molded in a randomly laminated and partially broken state. As a result, the graphite layers 54 inside each graphite particle are bent, deformed, or give rise to graphite-to-graphite contact, whereby complicatedly bent graphite layers are formed inside each graphite particle. Simultaneously therewith, voids (not shown) are formed between graphite layers.

After the press-molding of the mixture of the raw material graphite particles 50 and the recess-forming particles 52, the molded article obtained is pulverized and the recess-forming particles are separated and removed. FIG. 5(*c*) shows a state in which the recess-forming particles have been separated and removed from the mixture after the pulverization.

The graphite particles obtained are a mixture of nearly spherical graphite particles 57 (wherein graphite layers are bent and deformed) and scaly graphite particles 58 (wherein graphite layers are free from deformation).

Recesses 56 are formed in the surface of each graphite particle obtained. At the periphery of each recess (when two recesses are close, between the recesses) is formed a bulge 59 which projects toward outside. The bulge 59 has a laminated structure wherein graphite layers are converged toward the front end of the bulge. At the front end of the bulge 14, the graphite layers may partially be cut and incontinuous, or may be continuous without being cut.

Incidentally, in FIG. 5 as well, a case is shown in which the shape of each recess-forming particle 42 is spherical. However, as in the case of FIG. 4, the shape of each recess-forming particle 42 is not restricted to a spherical shape. Further, the direction of pressure application is not restricted to one direction and may be two directions intersecting at right angles, three directions, any multiple directions, or all directions.

The production process of the graphite particle of the present invention is described in more detail below.

<Raw Material Graphite Particle>

The raw material graphite used in the present invention may be any of artificial graphite and natural graphite. However, natural graphite is preferred because it is less expensive and abundant in resource. The purity of graphite is preferably 99.8% by mass or more, particularly preferably 99.95% by mass or more in view of the lower reactivity with hydrofluoric acid generated from electrolyte.

As to the average particle diameter of the raw material graphite particle, there is no particular restriction. However, the average particle diameter is preferably 5 to 50 µm from the standpoint of production efficiency. The preferred tap density of the raw material graphite particle is 0.5 to 1.3 g/ml and the specific surface area is 1 to 40 $m^2$/g.

The above-mentioned graphite particles 100, 200 and 300 can be produced separately by selecting respective raw material graphite particles.

As mentioned above, the graphite particle 100 can be produced according to the method described in JP-A-2003-238135 by using, as a raw material, graphite particles obtained by subjecting scaly graphite to a treatment for conversion into spherical graphite.

The outline of the treatment for conversion of scaly graphite into spherical particle shape is as follows.

The scaly graphite can be converted into spherical graphite by conducting a repeated pulverization treatment with a relatively small impact using an impact pulverizer such as hammer mill, pin mill or the like. The feeding or discharging of graphite particles into or from pulverizer is conducted preferably by allowing the graphite particles to accompany a gas stream such as air or the like. When pulverization is conducted batch-wise by allowing the graphite particles to accompany a gas stream, it is necessary to conduct repeated pulverization of at least ten times. In order to obtain a graphite particle 100 having an average particle diameter of 5 to 50 µm, the raw material graphite fed into impact pulverizer is beforehand subjected to preliminary pulverization to obtain an average particle diameter of 5 mm or less.

The graphite particle 300 can be produced only when scaly graphite particles are used as a raw material. In production using scaly graphite, the graphite particles actually obtained are a mixture of scaly graphite particles 300 and polyhedral graphite particles 200.

In production of the graphite particle 200, there is no particular restriction as to the particle shape of the graphite used as a raw material. The particle shape may be a scaly shape which is a particle shape of ordinary natural graphite, and may also be shapes obtained by subjecting natural graphite to secondary processing, such as spherical, pseudo-spherical, elliptical, spindle-like, spherical, pseudo-spherical, elliptical, onion-like and the like. As the method used in secondary processing of natural graphite into spherical shape or the like, there can be mentioned pressing.

In production of graphite particle 200 as well, it is economically advantageous to use natural graphite (scaly graphite) per se as a raw material, for cost reason.

<Recess-Forming Particle>

Recess-forming particles are mixed with raw material graphite particles; the mixture is pressed; then, the recess-forming particles are separated and removed; thereby, graphite particles having the above-mentioned recesses in the surface can be produced.

Since the average particle diameter of the graphite particles produced is 5 to 50 µm, the average particle diameter of the recess-forming particles is preferably 1 to 20 µm, more preferably 2 to 10 µm, particularly preferably 3 to 7 µm. In general, the average particle diameter of the recess-forming particles is preferably about ⅛ to ⅓ of the average particle diameter of the raw material graphite particles.

The shape of each recess-forming particle is preferably selected depending upon the shape of the raw material graphite particles; however, as the recess-forming particle of the present invention, there can be used particles of regular shape such as pollen-like, mesh-like, spherical, ellipsoidal, rectangular parallelepipedic, columnar, fibrous, needle-like or the like. Moreover, even particles of irregular shape can be used satisfactorily. Ordinarily, spherical particles are used preferably for good availability and low cost.

As the material of the recess-forming particle, there can be mentioned metals such as iron, copper, tin, aluminum, nickel and the like; oxides such as silica, alumina, zinc oxide, iron oxide and the like; synthetic polymers such as polyethylene, polyethylene terephthalate, polypropylene, polystyrene, polymethyl methacrylate, tetrafluoroethylene, phenolic resin and the like; carbon compounds such as coal, coal tar, coal pitch, petroleum pitch, coke, charcoal, carbon black, carbon formed by heat treatment and precursor or derivative thereof, and the like; sublimatable or volatile chemical substances such as naphthalene, olefin, natural wax, synthetic wax, malic acid, maleic acid, ammonium sulfate and the like; vegetable polymers such as wheat flour, starch, corn starch, carboxy cellulose, carboxymethyl cellulose, precursor or derivative thereof, and the like; and so forth. A solid material harder than graphite particle is preferred.

<Mixing Step>

In the mixing step, the raw material graphite particles and the recess-forming particles are mixed using a widely used mixer such as Henschel mixer, cutter mixer, V-shaped mixer or the like, to obtain a mixture.

The mixing ratio of the recess-forming particles to the raw material graphite particles is preferably 1% by mass or more, more preferably 5 to 60% by mass, particularly preferably 10 to 50% by mass.

<Press Molding Step>

In the press molding step, the mixture of the raw material graphite particles and the recess-forming particles is press-molded to obtain a molded article. The molding method includes a method of conducting molding under a pressure of 1 to 200 Mpa, using a press, an extruder, a compactor, a briquetting machine, a pelletizer, a CIP molding machine, or the like.

Preferred as the press are a wide-use press, a roll press, a vibration rod mill, a CIP molding machine, a compactor, a briquetting machine, etc. More preferred are a compactor and a roll press for easy handling and mass production.

The pressure of pressing differs depending upon the deformability of raw material graphite particle by recess-forming particle. Needless to say, a low pressure is used when the deformability is high, and a high pressure is used when the deformability is low. The range of pressure is preferably 1 to 50 MPa when the deformability is high, and is preferably 50 to 200 MPa when the deformability is low. As the pressure used is higher, the depth of recess formed is larger and the convergence of graphite layers at each bulge of graphite particle is higher.

The direction of pressure may be any one direction, or two or more directions, or whole directions. Pressure application from multiple directions include simultaneous pressure application from multiple directions and pressure application from multiple directions with the direction being gradually changed.

When scaly natural graphite is used as a raw material, plate-like graphite particle 300 is produced in a large proportion when pressure application is made from one direction, and nearly spherical graphite particle 200 is produced in a large proportion when pressure application is made from whole directions.

<Pulverization Step>

In the pulverization step, the molded article obtained in the press-molding step is pulverized using a pulverizer such as hammer mill, jaw crusher, pin mill, jet mill, coffee mill or the like, to obtain a pulverized material. The pulverization is preferably conducted so that the pulverized molded article (pulverized material) can have an average particle diameter of about 0.1 to 50 mm.

<Separation Step>

In the separation step, the recess-forming particles are separated from the pulverized material. The method for separation includes thermal separation, gas stream classification, water-flow separation, specific gravity separation, centrifugation, filtration separation, dissolution separation, extraction separation, magnetic separation, buoyancy separation, etc.

When there are used, as the recess-forming particles, particles of metal such as iron, copper, tin, aluminum, nickel or the like, there can be used classification treatment, water-flow separation, specific gravity separation, centrifugal treatment, magnetic separation, buoyancy separation, etc. for easy separation of recess-forming particles from pulverized material. When there are used, as the recess-forming particles, particles of oxide such as silica, alumina, zinc oxide, iron oxide or the like, acid washing is conducted as a pretreatment and then classification treatment or water-flow separation is conducted, whereby the recess-forming particles can be separated from the pulverized material. When there are used, as the recess-forming particles, a synthetic polymer such as polyethylene, polyethylene terephthalate, polypropylene, polystyrene, polymethyl methacrylate, tetrafluoroethylene, phenolic resin or the like, the recess-forming particles can be separated from the pulverized material by classification treatment, thermal treatment, or dissolution of recess-forming particles in organic solvent. Coal, coal tar, coal pitch, petroleum pitch, coke, charcoal, carbon black, carbon formed by heat treatment and precursor or derivative thereof, etc. can be separated by classification treatment, etc. When there are used, as the recess-forming particles, sublimatable or volatile chemical substances such as naphthalene, olefin, natural wax, synthetic wax, malic acid, maleic acid, ammonium sulfate and the like, they are vaporized by a heat treatment. Therefore, these chemical substances as recess-forming particles can be easily separated from graphite particles by a heat treatment. Vegetable polymers used as recess-forming particles, such as wheat flour, starch, corn starch, carboxy cellulose, carboxymethyl cellulose, precursor or derivative thereof, and the like, can be separated from graphite particles by being dissolved in hot water.

The thus-obtained graphite particle of the present invention can be used per se as a negative electrode material. The graphite particle may be subjected to a surface treatment such as CVD treatment using the graphite particle as a nucleus, in order to use the resulting composite particle of carbon-graphite two-layer structure as a negative electrode material. By covering the surface of graphite with a carbon layer, there can be obtained good diffusion of electrolytic solution into electrode and high rate charge-discharge property.

In contrast, the graphite particle of the present invention, not subjected to the surface treatment tends to cause particle-to-particle adhesion when it is pressed for production of a negative electrode of secondary battery. As a result, the interface of particle contacting with electrolytic solution may decrease. In this case, the diffusion speed of electrolyte into electrode of secondary battery obtained and the high rate charge-discharge property tends to be slightly inferior to the case in which the carbon-graphite composite particle described later is used as an electrode.

Carbon-Graphite Composite Particle

The carbon-graphite composite particle of the present invention is a particle having an average particle diameter of 5 to 50 μm obtained by covering the surface of the above-mentioned graphite particle 100, 200 or 300 with a carbon layer. In the surface thereof are formed one or more recesses as in the surface of the graphite particle constituting the carbon-graphite composite particle. Owing to the presence of these recesses, the present carbon-graphite composite particle can be clearly distinguished from conventional composite particle which is recess-free graphite particle covered with carbon.

The carbon-graphite composite particle of the present invention is covered, in the surface, with a carbon layer. However, since the coverage amount of the carbon layer is 20% by mass or less as described later, the shape of each recess in the composite particle is about the same as that in the graphite particle constituting the carbon-graphite composite particle. The covering carbon layer is highly crystalline and its interlayer spacing is 0.335 to 0.337 nm.

The carbon-graphite composite particle of the present invention can be produced by five steps, that is, a mixing step for mixing raw material graphite particles and recess-forming particles, a press molding step for press-molding the mixture obtained in the mixing step, to obtain a molded article, a pulverization step for pulverizing the molded article obtained in the press molding step, a separation step for separating and removing the recess-forming particles from the molded article pulverized in the pulverization step, to obtain a graphite particle, and a thermal CVD step for covering the graphite particle obtained in the separation step, with carbon.

The mixing step, the press molding step, the pulverization step and the separation step are the same as in the above-mentioned production process of graphite particle. The thermal CVD step is described in detail below.

<Thermal CVD Step>

The temperature in CVD treatment is preferably 800 to 1,200° C., more preferably 950 to 1,150° C. When the treatment temperature is less than 800° C., the covering carbon may have a low crystallinity and its average interlayer spacing d may be 0.336 nm or more. As the CVD treatment temperature is higher, the deposition rate of pyrolytic carbon is larger and the conversion of organic substance gas into carbon is higher; however, the growth of carbon occurs in a fibrous or soot state rather than in a film state, which is not preferred for uniform surface coverage. Also, there is a tendency of low crystallinity of covering carbon. Therefore, the CVD treatment temperature is preferably 1,200° C. or lower, more preferably 1,150° C. or lower.

As the organic substance used as the source for carbon, there can be mentioned monocyclic to tricyclic aromatic hydrocarbons such as benzene, toluene, xylene, styrene, ethylbenzene, diphenylmethane, diphenyl, naphthalene, phenol, cresol, nitrobenzene, chlorobenzene, indene, coumarone, pyridine, anthracene, phenanthrene and the like; and derivatives or mixtures thereof.

There can also be used, singly or in admixture, distillation oil, creosote oil and anthracene oil, obtained in distillation of coal tar; petroleum fraction or naphtha cracking tar; aliphatic hydrocarbons such as methane, ethane, propane, butane, pentane, hexane and the like; and alcohols which are derivatives of the aliphatic hydrocarbons.

There can also be used double bond-containing organic compounds such as acetylene, ethylene, propylene, isopropylene, butadiene and the like.

Of the above organic substances used as the source for carbon, particularly preferred are monocyclic aromatic hydrocarbons forming no tar during the CVD treatment, such as benzene, toluene, xylene, styrene and the like, and derivatives or mixtures thereof.

In the CVD treatment, the vapor deposition amount of carbon is preferably 20% by mass or less, more preferably 0.1 to 20% by mass, further preferably 0.5 to 10% by mass, particularly preferably 1 to 4% by mass, relative to the graphite particle. As the coverage amount of carbon increases, the inhibitory action for decomposition of electrolytic solution increases and a sufficient inhibitory action for decomposition of electrolytic solution appears at a coverage amount of carbon of 1% by mass or more relative to the graphite particle. When the coverage amount of carbon in the CVD treatment is more than 10% by mass relative to the graphite particle, battery properties reach a near saturation point and, even if roll pressing is conducted in electrode preparation, the deformation of material is small (hardly crushed), resulting in a low electrode density.

The coverage amount of carbon in carbon-graphite composite particle is determined so as to fit the application of lithium ion secondary battery. When the carbon-graphite composite particle is used as, for example, a negative electrode material of cellular phone, the coverage amount of carbon is preferred to be relatively small because the density of negative electrode is important. A preferred coverage amount of carbon is specifically 1 to 6% by mass. When the carbon-graphite composite particle is used as a negative electrode material of hybrid car battery, the coverage amount of carbon is preferred to be large for safety in order to sufficiently inhibit the decomposition of electrolytic solution. The amount is specifically 5 to 20% by mass.

The CVD treatment is preferably carried out in an inert gas (e.g. nitrogen) atmosphere using a fluidized bed reaction furnace. The inert gas is used mainly for remove of oxygen and unreacted organic gas from the reaction system and also is important as a fluidizing medium which forms a fluidized bed. The organic substance as a CVD carbon source is diluted by an inert gas (e.g. nitrogen) and is introduced into a fluidized bed. The concentration of the organic substance has a large influence on the crystallinity of the CVD carbon formed.

Owing to the above-mentioned CVD treatment can be obtained an increase in initial properties of battery and an increase in stability of negative electrode material.

Besides the CVD treatment, coverage of graphite particle with carbon is possible by allowing recess-forming particles (which, when heated, are decomposed into carbon and an organic gas, such as coal, coal tar, coal pitch, petroleum pitch, precursor or derivative thereof, or the like) to remain on the surface of graphite particle. It is apparent that the similar effect is obtained by the adhesion of coal tar or the like, but this approach has a drawback in lack of uniformity of carbon on graphite surface.

The carbon-graphite composite particle of the present invention can also be produced by using, in place of the above-mentioned raw material graphite particles, graphite particles subjected to a CVD treatment, to form recesses. However, with the composite particle obtained by this method, the carbon film formed prior to recess formation tends to be damaged and there is a fear that the carbon film is low in stability. Therefore, in producing the carbon-graphite composite particle, it is preferred that recesses are formed in raw material graphite particles and then a CVD treatment is conducted.

Determination Method of Depth and Diameter of Recess

The depth and diameter of each recess formed in the graphite particle or the carbon-graphite composite particle can be determined by analyzing the image obtained by a real surface view microscope by the following method.

Figure 6:
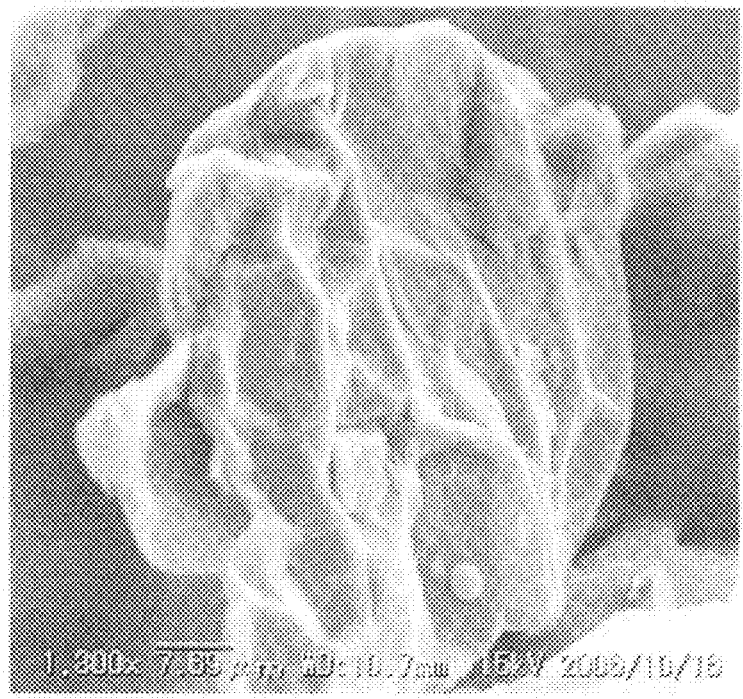
FIG. 6 is a SEM photograph showing the carbon-graphite composite particle obtained in Example 1.
Figure 7:
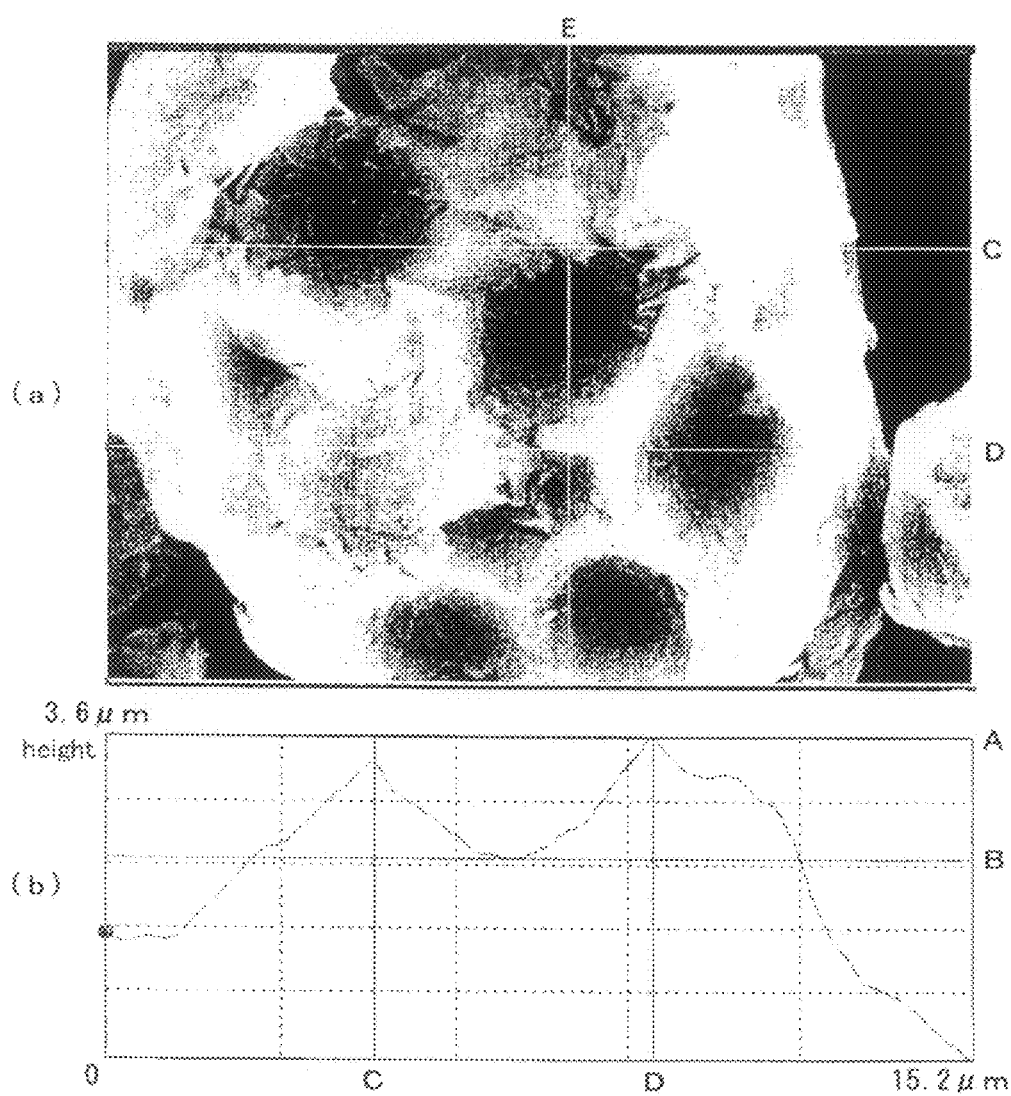
FIG. 7 is a real surface view microphotograph (a) showing the carbon-graphite composite particle obtained in Example 2 and a chart (b) for image analysis.

FIG. 7 is a real surface view microscope photograph (a) showing the carbon-graphite composite particle obtained by Example 2 described later and a chart (b) for image analysis. Horizontal lines C and D on the carbon-graphite composite particle of FIG. 6(a) are, in FIG. 6(b), vertical lines showing two peak positions. From the distance between these vertical lines C and D can be determined a diameter of recess.

A vertical line E in FIG. 6(a) shows a position at which the depth of recess has been measured. The lowest position in the middle of the vertical lines C and D of FIG. 6(b) is the bottom of the recess and the height of the bottom is shown by a horizontal line B. Of the peaks at the vertical lines C and D of FIG. 6(b), the height of higher peak [D in FIG. 6(b)] is shown by a horizontal line A. The distance between the horizontal lines A and B of FIG. 6(b) shows the depth of recess at the position of the vertical line E of FIG. 6(a).

The graphite particle having bulges, in which graphite layers are aligned vertically relative to the surface direction of particle, and the carbon-graphite composite particle formed using the graphite particle, show various characteristics such as high capacity, high coulomb efficiency and the like when used as a negative electrode for lithium ion secondary battery. Further, since recesses are formed in the surface of particle, peeling of electrode caused by crystallization of lithium salt is inhibited, resulting in an increase in charge-discharge cycle life characteristic. An electrolytic solution is held in the recesses formed in the carbon-graphite composite particle, the ion mobility in electrolytic solution increases, and charge and discharge at high rate becomes possible.

Negative Electrode Material for Lithium Ion Secondary Battery

The graphite particle of the present invention is desired to satisfy the following conditions (1) to (7) when used as a negative electrode material for lithium ion secondary battery.
(1) Tap Density is 0.5 to 1.5 g/ml.

The tap density of the graphite particle is preferably 0.5 to 1.5 g/ml, more preferably 1.0 to 1.2 g/ml.

The tap density is greatly influenced by the particle size and the shape of recess. That is, a small particle size and a large number of recesses result in a low tap density, and a large particle size and large and shallow recesses result in a higher tap density. By selecting the particle diameter of graphite particle and the shape of recess, the range of tap density can be allowed to be in the above-mentioned range.
(2) Aspect Ratio of Particle is 1 to 3.

The shape of graphite particle is not particularly restricted. However, it is preferably scaly, spherical or pseudo-spherical for easiness of production. The aspect ratio is preferably 1 to 3, more preferably 1 to 2.
(3) Peak Intensity Ratio (002/110) of 002 Plane (26.4°) and 110 Plane (77.4°) by X-Ray Diffractometry is 400 or Less.

The orientation of the graphite particle of the present invention is examined by X-ray diffractometry. The graphite particle of the present invention has a peak intensity ratio (002/110) of 002 plane (26.4°) and 110 plane (77.4°) as measured by X-ray diffractometry is 400 or less. From this value, it is understood that the AB plane of graphite crystal is unlikely to be orientated as compared with conventional graphite. The reason is considered to be that the laminated structure of graphite layers at the bulge formed at the periphery of each recess is converged toward its front end. The degree of convergence can be changed by selection of recess-forming particles or by selection of pressure application condition. Specifically explaining, as the pressure applied is increased, the peak intensity ratio of 002 plane (26.4°) and 110 plane (77.4°) can be lowered. A reduction in orientation of graphite particle contributes to an increase to charge-discharge rate property of negative electrode material for lithium ion secondary battery.

(4) Peak Intensity Ratio ($I_{1360}/I_{1580}$) of 1580 Cm$^{-1}$ Peak Intensity $I_{1580}$ and 1360 Cm$^{-1}$ Peak Intensity $I_{1360}$ by Raman Spectroscopy is 0.3 or Less.

The carbon condition of graphite surface can be examined by Raman spectroscopy. The peak intensity ratio ($I_{1360}/I_{1580}$) of 1580 cm$^{-1}$ peak intensity $I_{1580}$ and 1360 cm$^{-1}$ peak intensity $I_{1360}$ as measured by Raman spectroscopy is preferably 0.3 or less.

A peak intensity ratio ($I_{1360}/I_{1580}$) of more than 0.3 indicates the presence of many radical electrons on the surface of graphite surface and, when the graphite particle is used as a negative electrode material, there appear problems such as high reactivity with electrolytic solution. In this case, the reactivity with electrolytic solution can be improved by conducting a CVD treatment to trap (cover) the radical on graphite with the carbon formed, or by using a functional electrolytic solution containing an additive, to trap radical electrons.

Incidentally, when the graphite particle before coverage with carbon is used as a negative electrode material for lithium ion secondary battery in the presence of a functional electrolytic solution, the diffusion speed of electrolytic solution against graphite deteriorates rapidly at an electrode density of 1.6 g/ml or more. This indicates that the functional electrolytic solution, although effective for inhibition of the reaction with electrolytic solution, is unable to control particle space or the wettability between interface and electrolytic solution, which affects the diffusion speed of electrolytic solution. The carbon-covered graphite obtained by CVD treatment shows good diffusion speed of electrolytic solution but is inferior in cycle property. Although the cycle life property can be improved by using a conductive material, the conductive material fills the gap between graphite particles, inviting deterioration in diffusion speed of electrolytic solution. Thus, in an electrode having an electrode density of 1.6 g/ml or more, the diffusion speed of electrolytic solution and the cycle life property have a trade-off relation.

(5) Specific Surface Area is 40 M$^2$/G or Less.

In general, specific surface area differs depending upon the shape of raw material graphite, the crystallinity of raw material graphite, etc. However, in the graphite particle of the present invention, since the crystallinity of raw material graphite used in production varies only slightly, the particle size affects greatly. That is, a particle of smaller average particle diameter gives a larger specific surface area. In the above-mentioned range of average particle diameter, the maximum surface area is 40 m$^2$/g. A graphite particle having such a specific surface area, when used as a negative electrode material for lithium ion secondary battery, has a problem such as reduction in initial coulomb efficiency. Therefore, the specific surface area is preferably 5 m$^2$/g or less. There is no lower limit as to the preferred range of specific surface area; however, the lower limit of specific surface area of the graphite particle which can be produced in the above-mentioned range of average particle diameter, is 1 m$^2$/g.

(6) The Areal Ratio of Voids in Particle Section is 5% or Less of Total Sectional Area.

The areal ratio of voids in particle section is defined as the areal ratio of voids to the area of any section of particle (sectional area when an assumption is made that no void is present). The voids present in the graphite particle 100 or 200 can be reduced by a pressurization treatment but are difficult to eliminate completely. The areal ratio of voids does not greatly affect the properties of negative electrode material if it is 5% or less of the sectional area, but is preferably 1% or less.

When the graphite particle of the present invention is used as an electrode material, an increase in cycle life property is obtained. It is achieved by the two factors, i.e. the convergence of graphite layers at bulge and the holdability of recess for electrolytic solution and swell interference function. The convergence of graphite layers at bulge increases a conduction path between particles; therefore, an increase in bulge leads to marked improvement in cycle life property.

In general, graphite particle used as a negative electrode material swells to a 1.1- to 1.2-fold volume during charge. This swell during charge pushes the electrolytic solution held between graphite particles, out of the negative electrode material. Once the electrolytic solution is pushed out, it is difficult to fill the interstices between graphite particles of negative electrode with the electrolytic solution. When the filling of electrolytic solution between graphite particles is insufficient, lithium dendrite is formed at the interface of each graphite particle during charge.

In the graphite particle of the present invention, recesses are formed; therefore, holdability for electrolytic solution between particles is high and the influence by swell of graphite particles is reduced. As a result, dendrite is unlikely to be formed, which contributes to higher stability and safety of negative electrode material when the graphite particle of the present invention is used as a negative electrode material.

Also, when the graphite particle of the present invention is used as a negative electrode material, the charge-discharge cycle life property of the secondary battery obtained is improved because the present graphite particle has a larger surface area owing to the formation of recesses in the surface. In fact, good charge-discharge cycle life property is obtained even under a high density electrode condition of 1.7 g/ml or more. When the graphite particle has been subjected to a CVD treatment to obtain a carbon-graphite composite particle, an even higher charge-discharge cycle life property is obtained owing to an increase in electrode interface of lithium ion.

When the graphite particle or carbon-graphite composite particle of the present invention is used as a negative electrode material for lithium ion secondary battery, it is preferred to use a composite particle satisfying the following conditions (1) and (2).

Incidentally, the tap density, average particle diameter, X-ray diffraction, aspect ratio, and areal ratio of voids in particle section, of the carbon-graphite composite particle obtained by a CVD treatment are nearly the same as those of the graphite particle before the CVD treatment. Therefore, preferred values of the above items are the same as the above-mentioned values of the graphite particle.

(1) Peak Intensity Ratio ($I_{1360}/I_{1580}$) of 1580 Cm$^{-1}$ Peak Intensity $I_{1580}$ and 1360 cm$^{-1}$ Peak Intensity $I_{1360}$ by Raman Spectroscopy is 1.0 or Less.

The peak intensity ratio ($I_{1360}/I_{1580}$) as measured by Raman spectroscopy is preferably 1.0 or less, more preferably 0.3 to 0.7.

(2) Specific Surface Area is 10 M$^2$/G or Less.

The specific surface area of the carbon-graphite composite particle is preferably 10 m$^2$/g or less, more preferably 5 m$^2$/g or less. As to the preferred range of specific surface area, there is no lower limit; however, the range of specific surface area of the carbon-graphite composite particle which can be produced in the above-mentioned range of average particle diameter, is up to 1 m$^2$/g.

Particle tends to show a decrease in specific surface area after the CVD treatment. This is because carbon is filled in the micro-pores present in graphite particles, by the CVD treatment. It is generally known that, electrode material, as the specific surface area is larger, a non-conductor film is formed in a larger amount at the initial stage of charge and, resultantly, the initial irreversible volume increases. Therefore, when the carbon-graphite composite particle is used as a negative electrode material, the specific surface area thereof is preferably 10 m$^2$/g or less, particularly preferably 5 m$^2$/g or less.

Lithium Ion Secondary Battery

Description is made below on a lithium ion secondary battery using, as its negative electrode material, the graphite particle or carbon-graphite composite particle of the present invention.

<Negative Electrode>

There is no particular restriction as to the method for producing a negative electrode for lithium ion secondary battery using the graphite particle or carbon-graphite composite particle, having recesses formed in the surface. However, for example, the following method can be mentioned.

First, to a graphite particle or graphite-carbon composition particle is added, as a binder, a polyvinylidene fluoride (PVDF)/1-methyl-2-pyrrolidone solution, and the mixture is kneaded thoroughly to prepare a slurry containing graphite in an amount of 40% by mass or more.

Then, the slurry is applied on a metal foil (e.g. copper foil) in a thickness of 20 to 200 µm using a doctor blade or the like. Drying is conducted to allow the slurry on the metal foil to tightly adhere to the metal foil, whereby a metal foil collector is formed. And, a pressure is applied for higher adhesion to the metal foil collector and higher bulk density of negative electrode.

The bulk density of negative electrode (electrode density) is set at about 1.0 to 1.9 g/ml, preferably at 1.7 to 1.9 g/ml.

In the negative electrode for lithium ion secondary battery, of the present invention, even at the electrode density of 1.7 g/ml or more, there is no impairment of diffusion of electrolytic solution into electrode, or of high rate charge-discharge property, and the present negative electrode is suited for use as a negative electrode for lithium ion secondary battery of good cycle life property.

When the bulk density of negative electrode has been set at 1.7 to 1.9 g/ml, a space of 15 to 24% by volume in terms of void ratio is formed in the negative electrode. This void ratio is an optimum space volume for holding of electrolytic solution.

In the carbon-graphite composite particle of the present invention, whose surface is uniformly covered with carbon, when the coverage amount of carbon is more than 4% by mass, the amount of deformation caused by roll pressing is small, which is unable to achieve the above-mentioned bulk density of negative electrode. While roll pressing is used in many cases in actual production line of battery, it is difficult to convert the line pressure of roll pressing into a plane pressure of plate pressing. Therefore, comparison is made with the plane pressure of plate pressing in which universal comparison of pressure is possible. When a carbon-graphite composite particle having a concave-convex shape at the surface and having a small carbon coverage amount of 1 to 4% by mass has been pressurized at a plane pressure of 10 to 100 MPa, a negative electrode bulk density of 1.7 to 1.9 g/ml can be obtained.

As the binder for negative electrode, there is used a known material, for example, a pitch, a rubber or a synthetic resin. Of these, optimum are polyvinylidene fluoride (PVDF), carboxymethyl cellulose (CMC) and SBR latex rubber. The mixing ratio (mass ratio) of graphite particle or carbon-graphite composite particle and binder is desirably 100:2 to 100:20. The method for using such a binder is a know technique.

In lithium ion secondary battery, it is not necessary to use, as its negative electrode material, the graphite particle or carbon-graphite composite particle of the present invention in an amount of 100%. That is, it is possible to use, as a negative electrode material, a mixture containing spherical, scaly, or other graphite particle having no recess formed in the surface, in an amount of 50% or less, preferably 20% or less.

<Positive Electrode>

There is no particular restriction as to the positive electrode material. However, there can be suitably used $LiCoO_2$, $LiNiO_2$, $LiMn_2O_4$, $LiFePO_4$, etc., substitution compounds thereof with other element, and mixtures thereof. A powdery positive electrode material is mixed with a conductive material as necessary, is thoroughly kneaded with a solvent containing a binder, and is molded with a collector, to produce a positive electrode. These positive electrode materials and the above method for producing a positive electrode are known techniques.

<Separator>

There is no particular restriction, either, as to the separator, and a separator produced with a known material such as polypropylene, polyethylene or the like can be used.

<Electrolytic Solution>

As the non-aqueous solvent for electrolytic solution for lithium ion secondary battery, there can be used a known aprotic solvent of low dielectric constant, capable of dissolving a lithium salt. For example, solvents such as ethylene carbonate (EC), dimethyl carbonate (DMC), propylene carbonate (PC), diethylene carbonate, acetonitrile, propionitrile, tetrahydrofuran, γ-butyrolactone, 2-methyltetrahydrofuran, 1,3-dioxolane, 4-methyl-1,3-dioxolane, 1,2-dimethoxyethane, 1,2-diethoxyethane, diethyl ether, sulfolane, methylsulfolane, nitromethane, N,N-dimethylformamide, dimethyl sulfoxide and the like can be used singly or in admixture of two or more kinds.

The lithium salt used as an electrolyte includes $LiClO_4$, $LiAsF_5$, $LiPF_6$, $LiBF_4$, $LiB(C_6H_5)$, $LiCl$, $LiBr$, $CH_3SO_3Li$, $CF_3SO_3Li$, $Li(CF_3SO_2)_2N$, $Li(C_2F_5SO_2)_2N$, etc. These salts can be used singly or in admixture of two or more kinds.

Also, it is possible to use the above-mentioned electrolytic solution and an gel electrolyte obtained by converting an electrolyte into a gel, a polymer electrolyte (e.g. polyethylene oxide or polyacrylonitrile), or the like, to obtain a lithium polymer secondary battery. Also, it is possible to use a solid electrolyte to obtain a lithium total solid secondary battery.

EXAMPLES

The present invention is described more specifically below by way of Examples and Comparative Examples. In the Examples and Comparative Examples, the properties of graphite particle, carbon-graphite composite particle and negative electrode were measured by the following methods.

Tap Density:

Particles were put into a 100-ml, glass-made cylinder and tapped and, when there was no change in particle volume, the volume was measured. The mass of the particles was divided by the volume and the quotient obtained was taken as tap density.

Average Particle Diameter:

A dispersion of carbon-graphite composite particles was prepared using water as a solvent and an aqueous solution which contained 18% by mass of a mixture of a sodium salt of a straight chain alkylbenzenesulfonic acid and a polyoxyethylene alkyl ether as a dispersing agent. This dispersion was set in a laser diffraction type grain size tester (SALD 1000 manufactured by Shimadzu Corporation) for measurement of grain size distribution. From the grain size distribution obtained was determined the weight-average particle diameter of the carbon-graphite composite particles.

Concave-Convex Shape:

The shape of carbon-graphite composite particles was observed using a scanning electron microscope (SEM) manufactured by Nihon Denshi or keyence 3D real surface view microscope (model: VE-9800). Further, the image obtained by the real surface view microscope was analyzed by the above-mentioned method to determine the depth and diameter of recess.

Electrode Density:

A slurry containing 40% by mass of particles and 5% of a binder was prepared using CMC 1270 (a product of Daicel) as the binder and water as the solvent. The slurry was applied on a copper foil in a thickness of 130 μm with a doctor blade and dried, after which a given pressure was applied using a monoaxial press. From the resulting material was cut out a sample of 2.5 cm$^2$; its thickness was measured using a micrometer; the weight of the sample was divided by the area (cut-out area) and the thickness to determine an electrode density.

Coverage Amount of Carbon:

A reduction in weight was measured in floating air, using a thermogravimetric analyzer (TGA-50 manufactured by Shimadzu Corporation). The reduction in weight which was clearly different from the graphite component, was taken as carbon amount.

Diffusion Speed of Electrolytic Solution:

One drop of an electrolytic solution was dropped at 25° C. on an electrode of 1.8 g/ml obtained by pressing. A time from the dropping to the disappearance of the solution (drop) was measured and taken as time of diffusion.

Initial Battery Properties:

Initial charge capacity and discharge capacity were measured under the conditions shown in Table 1, using BTS 2005W manufactured by Nagano. Initial coulomb efficiency was calculated as follows.

Discharge capacity/charge capacity×100=initial coulomb efficiency (%)

Discharge Rate:

Charge was conducted under the conditions shown in Table 1, using BTS 2005W manufactured by Nagano. Discharge was conducted at a current density of 10 mA/cm$^2$ and its discharge capacity was measured. Discharge rate was calculated as follows.

(10 mA/cm$^2$ discharge capacity)/(0.4 mA/cm$^2$ discharge capacity)×100=discharge rate (%)

Capacity Retention:

Charge and discharge were repeated under the conditions shown in Table 1, using BTS 2005W manufactured by Nagano. Discharge capacities at 1st (1 cycle) and 50th (50th cycle) were measured. Capacity retention was calculated as follows.

50th discharge capacity/1st discharge capacity× 100=capacity retention (%)

X-Ray Diffraction:

Measured using an X-ray diffractometer, X'pert pro (trade name) manufactured by Phillips.

Raman Spectrometry:

Analysis by Raman spectrometry was conducted using a Raman spectrometer manufactured by JOBIN-YVON-SPEX. The spectrometer was 500M; the detector was Spectrum One CCD Detector; and the light source was an argon ion laser. The beam generated by the laser was 5145A and its output was 50 mW. The base line of the chart obtained was corrected, after which peak intensities at 900 to 1,200 cm$^{-1}$ (F), 1,360 cm$^{-1}$ (C) and 1,580 cm$^{-1}$ (G) were calculated and peak intensity ratios C/G and F/G were determined. The same measurement was repeated five times and respective averages of the two peak intensity ratios were determined. They were taken as peak intensity ratios of the material measured.

Specific Surface Area:

Measurement was conducted using a tester (belsorp type28 manufactured by BEL japan, inc.), and calculation was made according to the BET method.

Areal Ratio of Voids:

Graphite particles were mixed with an acrylic resin and a curing agent. The mixture was poured into a mold of 50 mm in diameter and cured therein. Then, the surface of the molded article was polished with an alumina of 0.2 μm, and the section of the particle was observed using a SEM. The area of the particle surface and the area of voids were determined by image analysis to calculate the areal ratio of voids.

TABLE 1

| Conditions of measurement of negative electrode for lithium ion battery | | |
|---|---|---|
| Cell | | Two electrodes (control electrode: metal lithium) |
| Particle mass | | 30 mg |
| Electrode area | | 2.5 cm$^2$ |
| Electrode density | | 1.8 g/ml |
| Binder | | PVDF, 9% by mass |
| Solvent used for preparation of graphite slurry | | 1-Methyl-2-pyrrolidone |
| Drying condition | | 130° C. and 5 hr, in vacuum |
| Electrolyte, conc. | | LiPF$_6$, 1 mol/l |
| Solvent composition | | EC/DMC = 1/2 (volume ratio) |
| During charge at constant Current | Current | 1 mA |
| | Current density | 0.4 mA/cm$^2$ |
| During charge at Constant voltage | Voltage | 1 mV |
| | Time | 1 hr |
| During discharge | Current | 1 mA |
| | Current density | 0.4 mA/cm$^2$ |
| | Voltage | 1500 mV |

Example 1

100 g of copper particles (average grain size: 10 μm) were added to 100 g of scaly graphite (average length in planar direction: 28 μm, thickness: 5 μm), followed by mixing for 5 minutes using a desktop mixer. The mixture obtained was molded into a columnar molded article of 4 to 5 cm in diameter at a pressure of 50 MPa, using a desktop molding machine. The molded article was pulverized to an average particle diameter of 40 µm in a mortar. The pulverized material was immersed in a 5 mass % sulfuric acid solution at room temperature for 24 hours to dissolve and remove the copper. The liquid containing the copper and the graphite was filtered, followed by washing with water to recover the graphite. The recovered graphite was kept at 105° C. for 12 hours for drying. The obtained graphite particles (10 g) was kept in an electric furnace in floating nitrogen at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc. The diameter of recess was 11.3 µm and the depth of recess was 4.5 µm. The SEM photograph of the particles obtained is shown in FIG. 6.

Comparative Example 1

10 g of scaly graphite (average particle size: 28 µm) was kept in an electric furnace in a nitrogen stream at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc.

Comparative Example 2

100 g of scaly graphite (average particle size: 28 µm) was mixed for 5 minutes using a desktop mixer. The resulting graphite was molded into a columnar molded article of 4 to 5 cm in diameter at a pressure of 50 MPa using a desktop molding machine. The molded article was pulverized using an ultra-centrifugal pulverizer (ZM 200 manufactured by Retsch). The pulverized material (10 g) was kept in an electric furnace in floating nitrogen at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc.

The results obtained in Example 1 and Comparative Examples 1 and 2 are shown in Tables 2 to 4.

TABLE 2

Properties of particles

| | Tap density (g/ml) | Average particle diameter (µm) | Coverage amount of carbon (% by mass) | Depth of recess |
|---|---|---|---|---|
| Example 1 | 1.1 | 29 | 2 | 4.5 |
| Comparative Example 1 | 0.6 | 28 | 3 | — |
| Comparative Example 2 | 1.1 | 29 | 2 | — |

TABLE 3

Properties of particles

| | Aspect ratio | X-ray diffraction | Raman spectrometry | Specific surface area (m²/g) | Areal ratio of voids (%) |
|---|---|---|---|---|---|
| Example 1 | 4.2 | — | 0.38 | 4.7 | 1 |
| Comparative Example 1 | 7.2 | — | 0.38 | 3.9 | 8 |
| Comparative Example 2 | 4.4 | — | 0.38 | 3.8 | 2 |

TABLE 4

Electrode properties of particles

| | Solution diffusion time (sec) | Discharge capacity (mAh/g) | Initial coulomb efficiency (%) | Discharge rate (%) | Capacity retention (%) |
|---|---|---|---|---|---|
| Example 1 | 350 | 362 | 94.2 | 83 | 98 |
| Comparative Example 1 | 500 | 362 | 94.3 | 70 | 51 |
| Comparative Example 2 | 480 | 361 | 94.5 | 77 | 49 |

As seen from the results of Table 2, in the carbon-graphite composite particles obtained in Example 1, the particle properties including the depth of recess were in the ranges specified in the present invention. The electrode formed using the carbon-graphite composite particles had properties preferable as those of the negative electrode for lithium ion secondary battery.

In contrast, the electrodes formed using the carbon-graphite composite particles obtained in Comparative Example 1 and Comparative Example 2 were low in capacity retention and had no properties preferable as those of the negative electrode for lithium ion secondary battery.

Example 2

10 g of silica particles (average particle size: 6 µm) were added to 100 g of spherical graphite (average particle size: 28 µm), followed by mixing for 5 minutes using a desktop mixer. The mixture obtained was molded into a columnar molded article of 4 to 5 cm in diameter at a pressure of 50 MPa, using a desktop molding machine. The molded article was pulverized in a mortar and the pulverized material was immersed in a 46 mass % hydrofluoric acid solution at room temperature for 24 hours to dissolve and remove the silica. The liquid containing the silica and the graphite was filtered, followed by washing with water to recover the graphite. The recovered graphite was kept at 105° C. for 12 hours for drying. The obtained graphite particles (10 g) were kept in an electric furnace in floating nitrogen at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc.

In FIG. 7 are shown a real surface view microscopic photograph (a) showing the obtained carbon-graphite composite particles and a chart (b) for image analysis. As a result of the above measurement, the diameter of recess was 4.9 µm and the depth of recess was 1.4 μm, and the averages of two recesses were 5 μm (recess diameter) and 1.5 μm (recess depth).

Example 3

Figure 8:
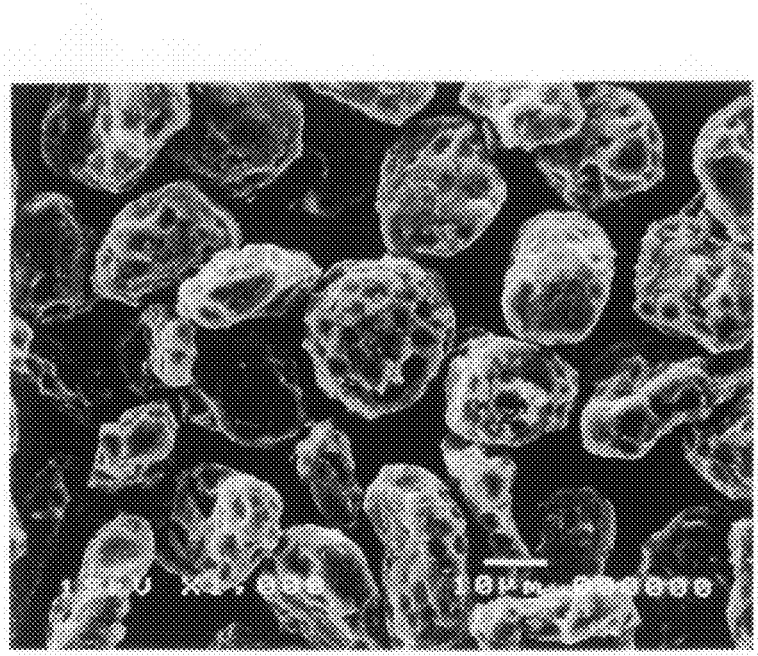
FIG. 8 is a SEM photograph showing the carbon-graphite composite particle obtained in Example 3.

20 g of polyethylene particles (average particle size: 5 μm) were added to 100 g of spherical graphite (average particle size: 26 μm), followed by mixing for 5 minutes using a desktop mixer. The mixture obtained was molded into a columnar molded article of 4 to 5 cm in diameter at a pressure of 50 MPa, using a desktop molding machine. The molded article was pulverized in a mortar and the pulverized material was kept in an electric furnace in floating nitrogen at 900° C. for 1 hour, to remove the polyethylene. The obtained graphite particles (10 g) were kept in an electric furnace in floating nitrogen at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc. The diameter of recess was 5.7 μm and the depth of recess was 2.1 μm. The SEM photograph of the obtained carbon-graphite composite particles are shown in FIG. 8.

Comparative Example 3

Figure 9:
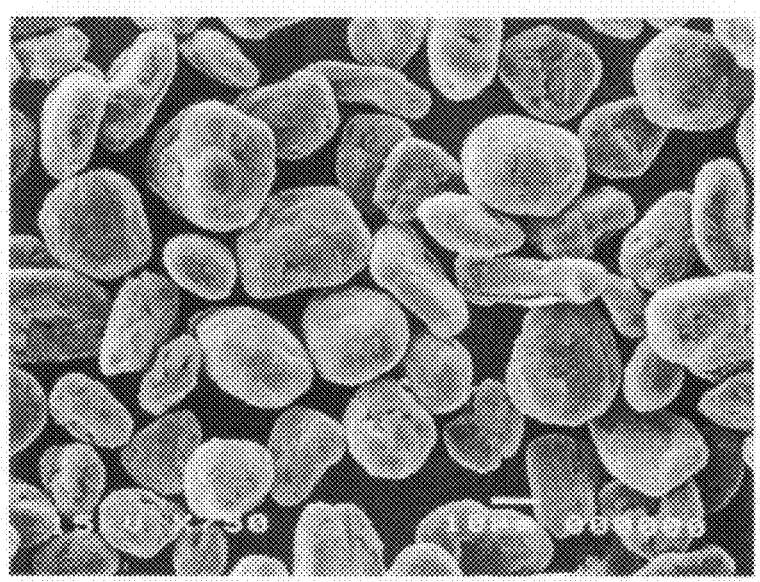
FIG. 9 is a SEM photograph showing the carbon-graphite composite particle obtained in Comparative Example 3.

10 g of spherical graphite (average particle size: 26 μm) was kept in an electric furnace in a nitrogen stream at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc. The SEM photograph of the obtained carbon-graphite composite particles are shown in FIG. 9.

Comparative Example 4

10 g of spherical graphite (average particle size: 26 μm) was kept in an electric furnace in floating nitrogen at 900° C. for 20 minutes and, during the period, 2 g of toluene was added to carry out a CVD treatment. The particles after the treatment were recovered and 5% by mass of an acetylene black conductive material was added thereto. The obtained particles were observed by a SEM and measured for tap density, average particle size, coverage amount of carbon, depth of recess, electrode density, electrode properties, etc.

Comparative Example 5

100 g of spherical graphite (average particle size: 26 μm) was stirred for 5 minutes using a desktop mixer. The resulting graphite was molded into a columnar molded article of 4 to 5 cm in diameter at a pressure of 50 MPa using a desktop molding machine. The molded article was pulverized using an ultra-centrifugal pulverizer manufactured by Retsch. The pulverized material (10 g) was kept in an electric furnace in floating nitrogen at 900° C. for 20 minutes and, during the period, 2 g of toluene was added to carry out a CVD treatment. The particles after the treatment were recovered, and were observed by a SEM and measured for tap density, average particle size, coverage amount of carbon, depth of recess, electrode density, electrode properties, etc.

The results obtained in Examples 2 to 3 and Comparative Examples 3 to 5 are shown in Tables 5 to 7.

TABLE 5

Properties of particles

| | Tap density (g/ml) | Average particle diameter (μm) | Coverage amount of carbon (% by mass) | Depth of recess |
|---|---|---|---|---|
| Example 2 | 1.0 | 27 | 3 | 1.4 |
| Example 3 | 1.2 | 25 | 2 | 2.1 |
| Comparative Example 3 | 0.9 | 28 | 2 | — |
| Comparative Example 4 | 1.2 | 27 | 2 | — |
| Comparative Example 5 | 1.2 | 27 | 2 | — |

TABLE 6

Properties of particles

| | Aspect ratio | X-ray diffraction | Raman spectrometry | Specific surface area ($m^2/g$) | Areal ratio of voids (%) |
|---|---|---|---|---|---|
| Example 2 | 1.4 | 239 | 0.39 | 3.3 | 1 |
| Example 3 | 1.5 | 256 | 0.42 | 3.2 | 1 |
| Comparative Example 3 | 1.7 | 422 | 0.41 | 3.0 | 17 |
| Comparative Example 4 | — | — | — | — | — |
| Comparative Example 5 | 2.1 | 560 | 0.40 | 3.6 | 2 |

TABLE 7

Electrode properties of particles

| | Solution diffusion time (sec) | Discharge capacity (mAh/g) | Initial efficiency (%) | Discharge rate (%) | Capacity retention (%) |
|---|---|---|---|---|---|
| Example 2 | 370 | 361 | 94.3 | 92 | 98 |
| Example 3 | 250 | 361 | 94.7 | 88 | 97 |
| Comparative Example 3 | 350 | 362 | 94.3 | 81 | 37 |
| Comparative example 4 | 800 | 357 | 92.6 | 76 | 97 |
| Comparative Example 5 | 270 | 361 | 94.5 | 82 | 35 |

As seen from the results of Table 5, in the carbon-graphite composite particles obtained in Examples 2 and 3, the particle properties including the depth of recess were in the ranges specified in the present invention. The electrodes formed using these carbon-graphite composite particles had properties preferable as those of the negative electrode for lithium ion secondary battery.

In contrast, the carbon-graphite composite particles obtained in Comparative Examples 3 and 5 deviated from the range of the present invention in depth of recess. The electrodes formed using these carbon-graphite composite particles were low in capacity retention and had no properties preferable as those of the negative electrode for lithium ion secondary battery.

5% by mass of an acetylene black conductive material was added to the carbon-graphite composite particles obtained in Comparative Example 3, in order to enhance the capacity retention. The resulting particles were measured for properties when used as a negative electrode for lithium ion secondary battery, in Comparative Example 4. The electrode was improved in capacity retention, but was inferior in absorbability for electrolytic solution, discharge capacity, initial efficiency and discharge rate and was not a satisfactory electrode.

Example 4

20 g of polyethylene particles (average particle size: 5 μm) were added to 100 g of spherical graphite (average particle size: 26 μm), followed by mixing for 5 minutes using a desktop mixer. The mixture obtained was molded into a columnar molded article of 4 to 5 cm in diameter at a pressure of 50 MPa, using a desktop molding machine. The molded article was pulverized in a mortar and the pulverized material was kept in an electric furnace in floating nitrogen at 900° C. for 1 hour for firing, to remove the polyethylene. The obtained graphite particles (10 g) were observed by a SEM and measured for tap density, average particle size, coverage amount of carbon, depth of recess, electrode density, electrode properties, etc. The diameter of recess was 5.9 μm and the depth of recess was 2.3 μm.

Comparative Example 6

10 g of spherical graphite (average particle size: 26 μm) was kept in an electric furnace in floating nitrogen at 900° C. for 20 minutes to conduct a heat treatment. The particles after the treatment were recovered, and were observed by a SEM and measured for tap density, average particle size, coverage amount of carbon, depth of recess, electrode density, electrode properties, etc.

The results obtained in Example 4 and Comparative Example 6 are shown in Tables 8 to 10.

TABLE 8

| | Properties of particles | | | |
|---|---|---|---|---|
| | Tap density (g/ml) | Average particle diameter (μm) | Coverage amount of carbon (% by mass) | Depth of recess |
| Example 4 | 1.1 | 25 | 0 | 2.3 |
| Comparative Example 6 | 1.1 | 26 | 0 | — |

TABLE 9

| | Properties of particles | | | | |
|---|---|---|---|---|---|
| | Aspect ratio | X-ray diffraction | Raman spectrometry | Specific surface area (m$^2$/g) | Areal ratio of voids (%) |
| Example 4 | 1.6 | 267 | 0.16 | 4.2 | 2 |
| Comparative Example 6 | 2.0 | 470 | 0.18 | 4.1 | 22 |

TABLE 10

| | Electrode properties of particles | | | | |
|---|---|---|---|---|---|
| | Solution diffusion time (sec) | Discharge capacity (mAh/g) | Initial efficiency (%) | Discharge rate (%) | Capacity retention (%) |
| Example 4 | 460 | 365 | 92.7 | 84 | 99 |
| Comparative Example 6 | 610 | 361 | 92.5 | 70 | 41 |

As seen from the results of Table 8, in the graphite particles obtained in Example 4, the particle properties including the depth of recess were in the ranges specified in the present invention. The electrode formed using the particles had properties preferable as those of the negative electrode for lithium ion secondary battery.

In contrast, the graphite particles obtained in Comparative Example 6 were low in capacity retention and had no properties preferable as those of the negative electrode for lithium ion secondary battery.

The invention claimed is:

1. A process for producing a graphite particle having an average particle diameter of 5 to 50 μm, wherein ten or more recesses having a depth of 0.5 to 10 μm are formed in the surface by ten or more recess-forming particles pushed into each AB plane of graphite crystal to deform, the diameter of each recess being 1/5 to 1/3 of the particle diameter of said graphite particle, which method comprises:
    mixing raw material graphite particles and recess-forming particles,
    press-molding the mixture composed of the raw material graphite particles and the recess-forming particles to obtain a molded article,
    pulverizing the molded article, and
    separating and removing the recess-forming particles from the pulverized molded article to obtain said graphite particle.

2. A process for producing a graphite particle according to claim 1, wherein each raw material graphite particle has an approximately spherical shape having an aspect ratio of 1 to 3 and has inside a laminated structure of graphite layers wherein each AB plane of graphite crystal is bent concentrically along the particle surface.

3. A process for producing a graphite particle according to claim 1, wherein each raw material graphite particle has a scaly shape.

4. A process for producing a graphite particle according to claim 1, wherein the raw material graphite particles are artificial graphite or a natural graphite and have a spherical, scaly, pseudo-spherical, elliptical, fibrous, spindle-like, or onion-like shape.

5. A process for producing a graphite particle according to claim 1, wherein the material of the recess-forming particles is selected from metals, oxides, synthetic polymers, carbon compounds, sublimable or volatile chemical substances, and vegetable polymers and has an average particle diameter of 1 to 20 μm.

6. A process for producing a graphite particle according to claim 1, wherein the material of the recess-forming particles is selected from iron, copper, tin, aluminum and nickel; silica, alumina, zinc oxide and iron oxide; polyethylene, polyethylene terephthalate, polypropylene, polystyrene, polymethyl methacrylate, tetrafluoroethylene and phenolic resin; coal, coal tar, coal pitch, petroleum pitch, coke, charcoal, carbon black, carbon formed by thermal firing, and precursor or derivative thereof; naphthalene, olefin, natural wax, synthetic wax, malic acid, maleic acid and ammonium sulfate; wheat flour, starch, corn starch, carboxy cellulose, carboxymethyl cellulose, and precursor or derivative thereof.

7. A process for producing a graphite particle according to claim 1, wherein the mixing ratio of the recess-forming particles to the raw material graphite particles is 1 to 60% by mass.

8. A process for producing a graphite particle according to claim 1, wherein the raw material graphite particles have an average particle diameter of 5 to 50 vim, a tap density of 0.5 to 1.3 g/ml, a specific surface area of 1 to 40 m$^2$/g, and an ash content of 0.2% by mass or less.

9. A process for producing a carbon-graphite composite particle, said composite particle comprising
 a graphite particle and
 a carbon layer covering the surface of said graphite particle,
which method comprises covering the surfaces of graphite particles, said particles having an average particle diameter of 5 to 50 μm and having, in their surfaces, ten or more recesses having a depth of 0.5 to 10 μm formed in the surfaces by ten or more recess-forming particles pushed into each AB plane of graphite crystal to deform, with a carbon layer by a thermal CVD step, the diameter of each recess being ⅕ to ⅓ of the particle diameter of the graphite particle.

10. A process for producing a carbon-graphite composite particle according to claim 9, wherein the thermal CVD step is performed in a fluidized bed type reaction furnace, in an inert atmosphere, at 800 to 1,200° C., by a thermal CVD method using an organic solvent as a carbon source and wherein the coverage amount of carbon to graphite particle is 0.1 to 20% by mass.

* * * * *